(12) United States Patent
Ito et al.

(10) Patent No.: US 9,622,015 B2
(45) Date of Patent: Apr. 11, 2017

(54) SYSTEM AND METHOD FOR CONTROLLING A PRINTING APPARATUS

(71) Applicant: SEIKO EPSON CORPORATION, Tokyo (JP)

(72) Inventors: Yasuharu Ito, Matsumoto (JP); Kan Matsuda, Shiojiri (JP); Toshiaki Okayama, Ikeda-machi (JP); Yoshitomo Takatsuna, Matsumoto (JP); Kiyoshi Yoda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 14/102,256

(22) Filed: Dec. 10, 2013

(65) Prior Publication Data
US 2014/0162621 A1    Jun. 12, 2014

(30) Foreign Application Priority Data

Dec. 11, 2012   (JP) .................................. 2012-270083
Aug. 30, 2013   (JP) .................................. 2013-179101

(51) Int. Cl.
*H04W 4/00*   (2009.01)

(52) U.S. Cl.
CPC .................................. *H04W 4/003* (2013.01)

(58) Field of Classification Search
CPC ......................................................... G06F 17/30
USPC .............................. 455/456.1; 707/769, 799
See application file for complete search history.

(56) References Cited

U.S. PATENT DOCUMENTS

| | | | |
|---|---|---|---|
| 8,681,361 B2* | 3/2014 | Miller | G06F 3/1204 358/1.1 |
| 2004/0002943 A1* | 1/2004 | Merrill | H04L 41/0893 |
| 2008/0319952 A1 | 12/2008 | Carpenter et al. | |
| 2008/0320296 A1* | 12/2008 | Walker | G06F 3/1222 713/150 |
| 2009/0019160 A1 | 1/2009 | Schuler | |
| 2013/0128306 A1* | 5/2013 | Takahashi | G06F 3/1204 358/1.15 |

FOREIGN PATENT DOCUMENTS

| | | | | |
|---|---|---|---|---|
| CA | EP 2306692 A1 * | 4/2011 | .......... | H04M 1/7253 |
| JP | 2008-040914 | 2/2008 | | |

* cited by examiner

*Primary Examiner* — Vladimir Magloire
*Assistant Examiner* — Majid Syed
(74) *Attorney, Agent, or Firm* — Workman Nydegger

(57) ABSTRACT

A device system is configured to determine an access address for acquiring a control unit that controls the device according to property information of a mobile communication terminal, in response to a request from the mobile communication terminal connected to a network.

6 Claims, 5 Drawing Sheets

INITIAL SCREEN

SCREEN SHOWING ADDED FUNCTION

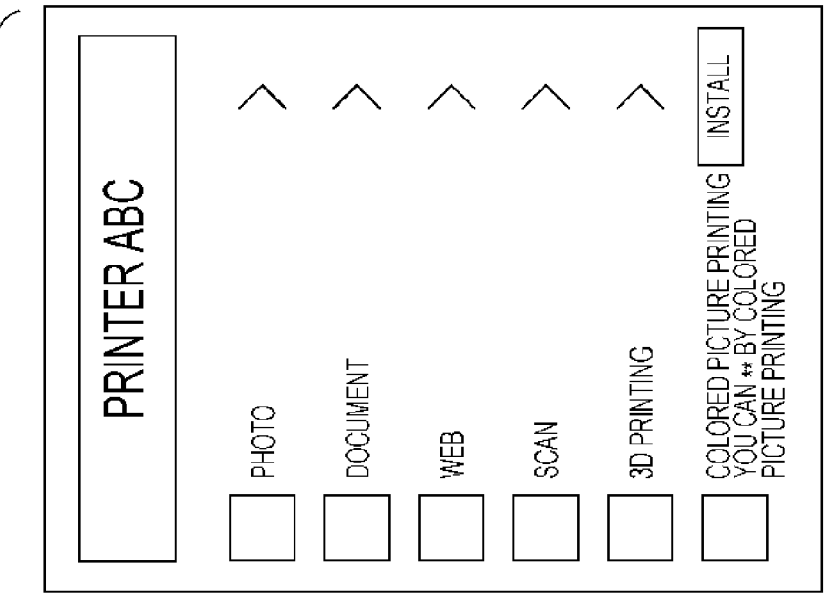
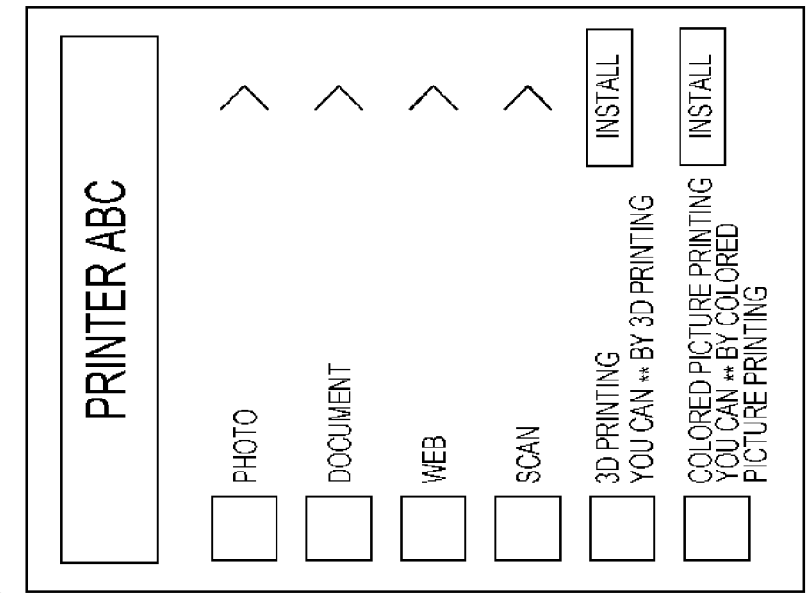
FIG. 5

SYSTEM AND METHOD FOR CONTROLLING A PRINTING APPARATUS

This application claims priority to Japanese Application No. 2012-270083 filed on Dec. 11, 2012 and Japanese Application No. 2013-179101 filed Aug. 30, 2013. The foregoing applications are incorporated by reference in their entirety.

BACKGROUND

1. Technical Field

The present invention relates to systems and methods for controlling a printing apparatus. More particularly, embodiments of the invention relate to systems and methods for acquiring a print control program and for controlling a printing apparatus.

2. Related Art

To acquire a print control program, print control apparatuses such as a computer have to recognize accurate property information or properties of the printer to be utilized or controlled, including the name of the manufacturer, the model number, and so forth. According to JP-A-2008-40914 for example, the property information of the printer is expressed by a two-dimensional barcode. The computer can recognize the property information of the printer by reading the two-dimensional barcode through a mobile terminal and analyzing the barcode. Then, the user can acquire the corresponding print control program, based on the property information of the printer obtained from the two-dimensional barcode.

With the recent spread of mobile communication terminals including smartphones and tablet terminals, there is increasing demand for the ability to install a control program for a device in the mobile communication terminal. However, acquiring the address information necessary to obtain and install the control program involves complicated procedures. In addition, the process of acquiring the property information related to the device further complicates the process of obtaining the control program.

SUMMARY

Embodiments of the invention provide systems and methods that facilitates acquisition of address information that enables a control program of a device such as a printer to be obtained. Embodiments of the invention also facilitate the acquisition of information related to the device.

In one embodiment, a system includes a server connected to a mobile communication terminal through a network. The system is configured to cause the mobile communication terminal to acquire an access address of a first control unit. The first control unit, when operated on the mobile communication terminal, controls a predetermined device. The server is configured to receive property information or properties of the mobile communication terminal, determine the access address of the first control unit according to the property information of the mobile communication terminal, and generate a first setting screen to be displayed on the mobile communication terminal. The server is also configured to allow the mobile communication terminal to be connected to the determined access address, and transmit the first setting screen to the mobile communication terminal. The first setting screen thus includes the information generated by the server, including the access information, which can be followed to acquire the control unit.

In another aspect, embodiments of the invention provide a system configured to identify an access address for acquiring a predetermined program from a first server in which a program that can be installed in a mobile communication terminal is stored. The predetermined program includes a first control unit and a second control unit that control a predetermined device upon being installed in the mobile communication terminal. The system includes a second server that identifies a network connection destination in the first server according to property information of the mobile communication terminal with respect to the first control unit, and according to device information of the predetermined device with respect to the second control unit. The second server transmits each connection destination to the mobile communication terminal. In one example, the first control unit relates to a control program to control the predetermined device and the second control unit relates to expanded functionality of the predetermined device.

In still another aspect, embodiments of the invention provide a device including a storage unit configured to store an access address of a program management server. The storage unit may be stored in a program management server associated with a mobile communication terminal and controlled by a control unit that the mobile communication terminal is capable of operating. The device may also include an input unit that receives property information from the mobile communication terminal, a conversion unit that converts, according to the property information, the access address of the program management server associated with the mobile communication terminal into an image that can be read by the mobile communication terminal, and a display unit that displays the image.

In still another aspect, embodiments of the invention relate to devices, mobile communication terminals, or the like or any combination thereof.

BRIEF DESCRIPTION OF THE DRAWINGS

Embodiments of the invention will be described with reference to the accompanying drawings, wherein like numbers reference like elements.

FIG. 5 illustrates examples of user interface screens according to the print control program.

DESCRIPTION OF EXEMPLARY EMBODIMENTS

Embodiments of the invention relate to systems and methods for installing a control program on a device such as a mobile communication terminal. The control program enables the device to control another device, such as a printer or a printing system.

Figure 1:
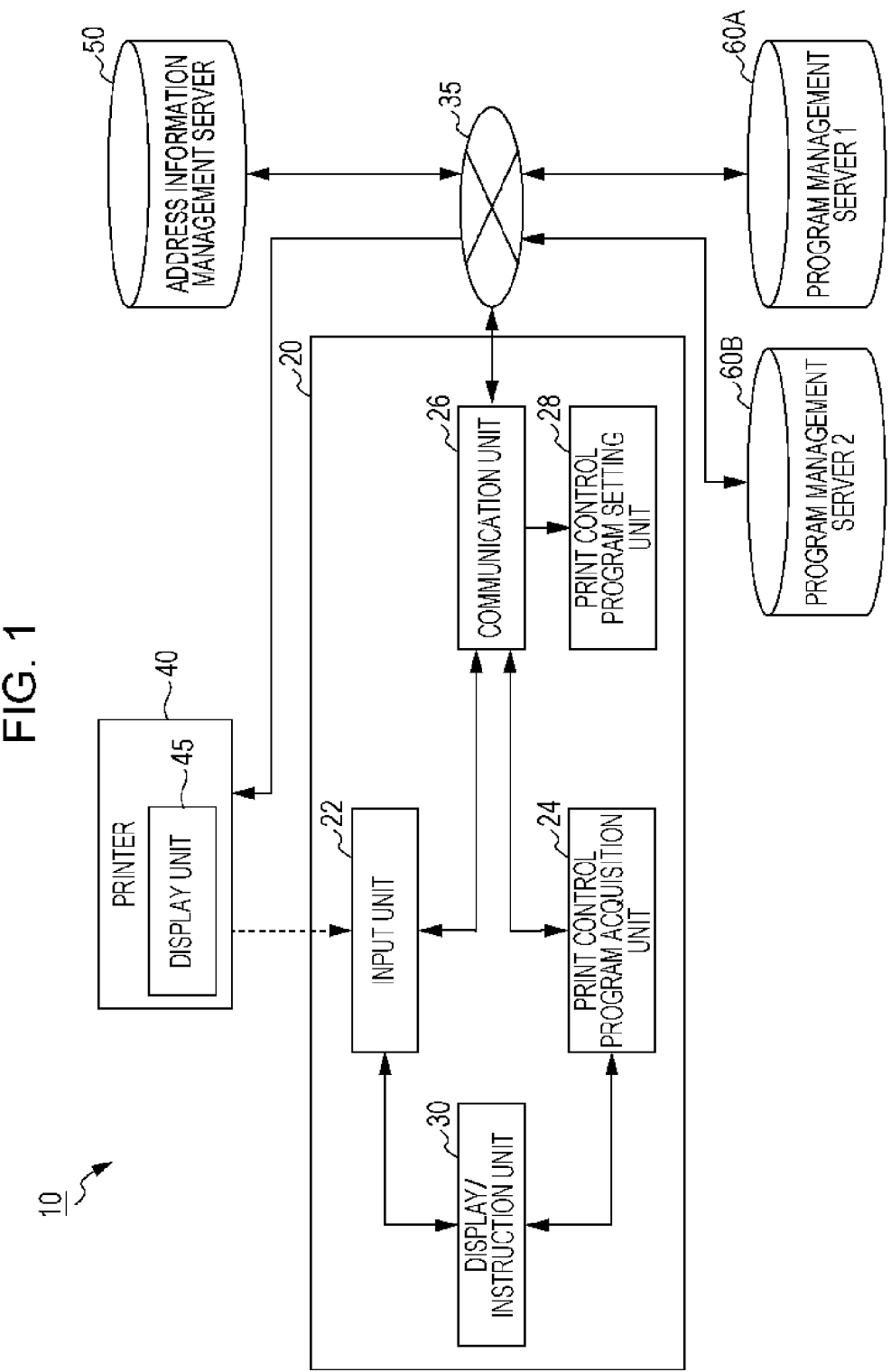
FIG. 1 illustrates an example of a block diagram showing a general configuration of a printing system according.

FIG. 1 illustrates a block diagram showing an example of a general configuration of a printing system 10 and provides an example of a device control system. The printing system 10 includes a mobile communication terminal 20, a printer 40, a program management server 60 (e.g., program management server 1 60A) containing a print control program, an address information management server 50 that identifies an access address for acquiring the print control program, and another program management server 60 (e.g., program management server 2 60B) containing a print control program and other programs. The mobile communication terminal 20, the printer 40, the address information management server 50, and the program management servers 60A and 60B are communicably connected to one another via a network 35 such as the Internet.

FIG. 1 illustrates two program management servers 60 are provided according to the OS (operating system) employed in the mobile communication terminal 20, namely a program management server 1 (60A) and a program management server 2 (60B). The program management server 1 (60A) controls application programs driven by terminals operating under, by way of example only, ANDROID® and the program management server 2 (60B) controls application programs driven by terminals operating under, by way of example only, iOS®. In one example, a single program management server could control or store control programs for multiple operating systems. Alternatively, one or more program management servers may control or store control programs for one or more operating system.

The mobile communication terminal 20 may be a high-performance mobile phone such as smartphone, or a multi-function mobile terminal such as a tablet terminal. The mobile communication terminal 20 includes, in one example, an input unit 22 for receiving address information from the address information management server 50, address information for acquiring a print control program from the program management server 60, and model information of the printer 40. The mobile communication terminal also includes a print control program acquisition unit 24, a communication unit 26, a print control program setting unit 28, and a display/instruction unit 30.

The mobile communication terminal 20 includes as hardware a CPU, a RAM, a ROM, a flash memory, a communication circuit, a touch panel, and so forth and activates the foregoing units utilizing the cited hardware in collaboration with software stored in the RAM, the ROM, and the flash memory. For example, the communication unit 26 includes a communication circuit connectable to the network 35 via wired or wireless communication. The display/instruction unit 30 may be, for example, a touch panel that displays regions to be pressed by a finger at a designated region.

The printer 40 exemplifies the device to be connected to the network 35. The printer 40 may include a display unit 45 that displays information and images. The printing method of the printer 40 is not specifically limited, but may be typically exemplified by ink jet printing or electronic photography.

The address information management server 50 is configured to acquire property information or properties of the mobile communication terminal 20 and property information or properties such as a model information of the printer 40, through communication with the mobile communication terminal 20. The address information management server 50 also identifies the program management server 60 (either the program management server 1 (60A) or program management server 2 (60B) in this example) according to the property information of the mobile communication terminal 20. The address information management server 50 also identifies a print control program that is capable of controlling the operation and functions of the printer 40 according to the properties and model of the mobile communication terminal 20 and the printer 40. With the property information, the address information management server 50 identifies the access address for acquiring the print control program in the identified one of the program management servers 60A and 60B.

The address information management server 50 is also capable of extracting function expansion information (described later) indicating functions that can be added in relation with the functions of the printer 40 (for example, a program to perform an expanded function) according to the model information acquired from the printer 40, and address information for acquiring the function expansion information. The address information management server 50 may utilize a table for example, to perform the mentioned identification.

In one example, it is not mandatory to acquire the model information of the printer 40 in order to acquire the print control program, in the case where the print control program is not exclusive to a specific model of the printer but is compatible among different models.

Further, the address information management server 50 is capable of generating, as a first setting screen, an installation guide screen 70 (see FIG. 3) that directs a user to access the network connection destination corresponding to the identified print control program, in HTML language or the like, and transmitting the data of the generated installation guide screen 70 to the mobile communication terminal 20. For example, the network connection destination may be an IP address or a uniform resource locator (URL) corresponding to the print control program. In one embodiment the network connection destination is the access address of either of the program management server 1 (60A) and the program management server 2 (60B).

The program management server 60 is configured to manage various programs that can be executed by the device. The programs include a device control program such as the print control program.

After the device (e.g., the mobile communication terminal 20) selects or follows the network connection destination, the program management server 60 is configured to transmit an installation execution screen 80 (see FIG. 3) of the print control program to the mobile communication terminal 20. The program management server 60 also transmits the data of the print control program to be installed on the mobile communication terminal 20. The screen 80 and the data are transmitted, for example, when the user manipulates a predetermined trigger (for example, Go button 74) in the installation guide screen 70 (FIG. 3) displayed on the mobile communication terminal 20.

As described above, the program management server 60 that is accessed by the mobile communication terminal 20 depends, in one example, on the OS employed by the mobile communication terminal 20. To select the program management server 60 (e.g., the server 60A or the 60B) according to the OS of the mobile communication terminal 20, the address information management server 50 generates the installation guide screen 70 associated with the program management server 60 corresponding to the mobile communication terminal 20, by utilizing the property information (including the OS information) acquired from the mobile communication terminal 20. The address information management server 50 uses the property information of the mobile communication terminal 20 to generate the installation guide screen. More specifically, the address information management server 50 embeds, in the installation guide screen 70, the access address in the program management server 60 according to the OS information of the mobile communication terminal 20. The access address may be embedded, for example, as a link to the URL of the appropriate information management server 50. In one example, terminals associated with a first OS receive a link to the server 60A while terminals associated with a second OS that is different from the first OS receive a link to the server 60B.

The units of the mobile communication terminal 20 will now be described. The input unit 22 acquires an access address of the address information management server 50 from the printer 40. More specifically, the input unit 22 acquires, from the printer 40 and in response to an instruction of the user given through the display/instruction unit 30, the access address of the address information management server 50. In order to acquire the print control program for the printer 40 and the model information of the printer 40, the access address of the address information management server 50 is accessed first.

The communication unit performs network communication. The input unit 22 accesses the address information management server 50 through the communication unit 26 according to the access address acquired from the printer 40. Then, the input unit 22 acquires, from the address information management server 50, the installation guide screen 70 (see FIG. 3) that contains the link to the URL. The URL is the access address for acquiring the printer control program in the program management server 60. The link to the URL in the installation guide screen 70 is based on, in one example, the property information of the mobile communication terminal 20 and the model information of the printer 40. The input unit 22 also displays the installation guide screen 70 acquired from the address information management server 50 on the display/instruction unit 30.

In one embodiment, the access address of the address information management server 50 is stored in the printer 40, and is displayed on the display unit 45 in a predetermined display pattern, through a predetermined operation.

The access address for acquiring the printer control program is represented, in one example, by a URL indicating the address on the website. In one example, the information displayed on the display unit 45 is a two-dimensional barcode, for example a QR Code®. In other words, the URL or link is displayed in one example as a two-dimensional bar code, or is expressed as an image indicating the access address. Alternatively, for example, the input unit 22 may be configured to acquire the access address of the program management server 60 when the user reads and inputs a character string of the URL displayed on the display unit 45 or the URL cited on the manual of the printer 40 into the mobile communication terminal 20.

In addition, the printer 40 may transmit a sound signal or an electromagnetic signal representing the access address of the address information management server 50 in a decodable manner. The input unit 22 may receive and analyze the sound or electromagnetic signal so as to acquire the access address represented by the signal.

The model information stored in the printer 40 may be utilized as the access address for acquiring the printer control program in the program management server 60. Although the access address according to this embodiment is common irrespective of the model of the printer 40, the printer 40 may display the access address of the address information management server 50 corresponding to its own model information, in the case where the address information management server 50 provides different access addresses for the respective models of the printer 40. In this embodiment, the model information to be acquired by the mobile communication terminal 20 is expressed as a two-dimensional barcode, for example a QR Code®, together with the access address of the address information management server 50, so that the mobile communication terminal 20 electronically can read the information with an image sensor or the like. Alternatively, such information may be transmitted through a predetermined communication transaction between the printer 40 and the mobile communication terminal 20.

The model information is utilized for acquiring function expansion information that identifies functions that can be added in relation to the functions of the printer 40 (for example, a program to perform an expanded function) and the access address for acquiring such function expansion information. The model information is can be used for more than acquiring the access address for the printer control program in the program management server 60. This is because, in one example, in the case where the function expansion information is related to a function of the printer 40, the range of the function expansion information that can be utilized by the mobile communication terminal 20 may be limited by the function of the printer 40. Further, since it is not mandatory to acquire the model information in order to acquire the print control program in the case where the print control program is not exclusive to a specific model of the printer but is compatible among different models, the model information may be acquired from a predetermined unit in which the model information is stored, for example the printer 40, at the time of acquiring the function expansion information.

The print control program acquisition unit 24 accesses the link to the installation execution screen 80 (see FIG. 3) included in the installation guide screen 70, in response to the instruction of the user made on the installation guide screen 70. The installation guide screen 70 may be composed of HTML data and may be displayed on the mobile communication terminal 20. More specifically, the print control program acquisition unit 24 accesses the program management server 60 connected via the network 35 to acquire the installation execution screen 80 generated by the program management server 60. The print control program acquisition unit 24 displays the installation execution screen 80 thus acquired on the display/instruction unit 30. In one example, the print control program acquisition unit 24 is configured to download the printer control program from the program management server 60, according to the instruction to execute the installation from the user made on the installation execution screen 80 displayed on the display/instruction unit 30.

The print control program setting unit 28 acquires the printer control program received from the program management server 60 according to the request for downloading the print control program. The print control program setting unit 28 performs a predetermined installation process of the acquired print control program, to thereby set the print controlling function, provided by the printer control program on the mobile communication terminal 20, such that the print controlling function is ready to be activated.

Figure 2:
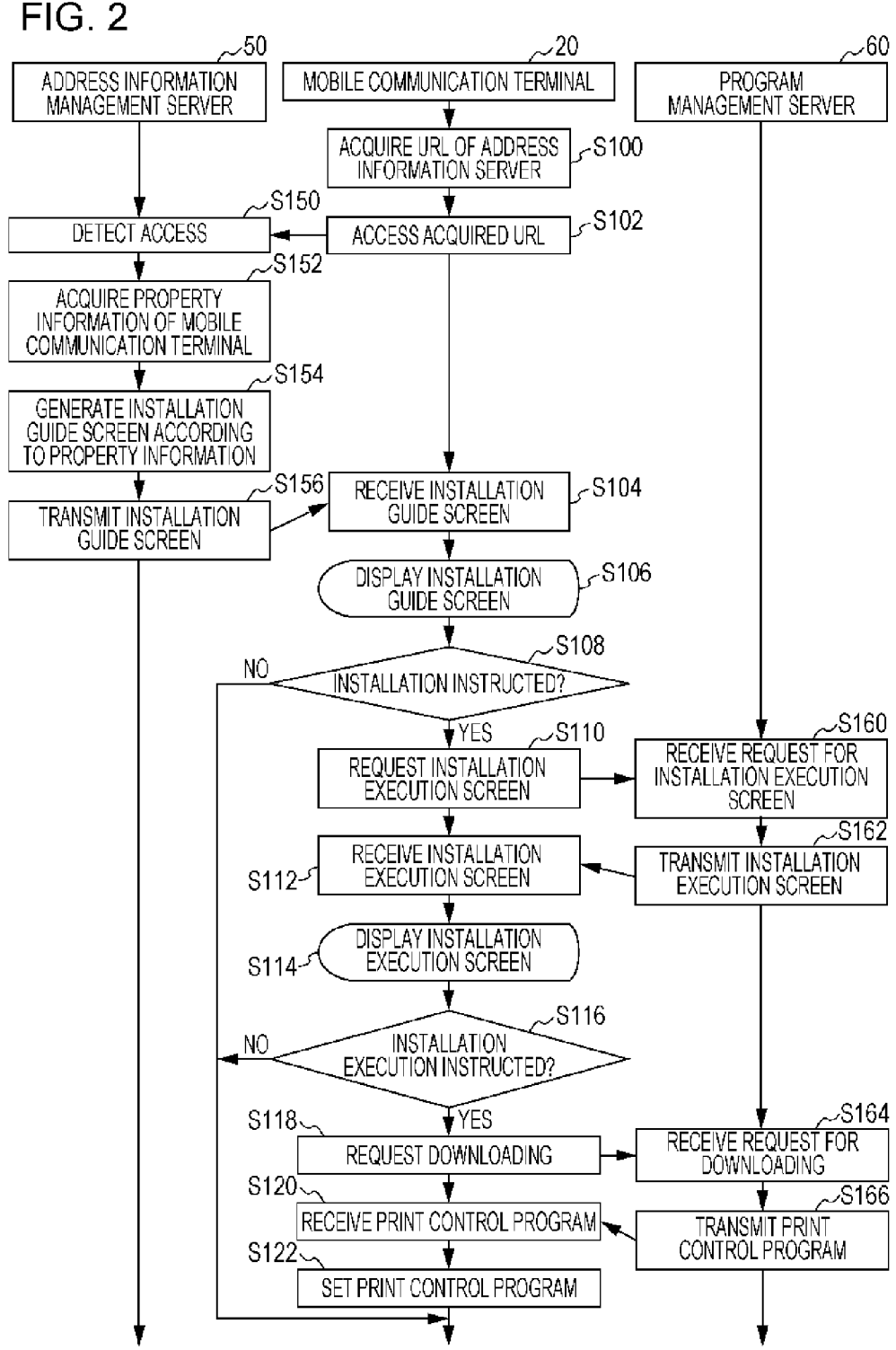
FIG. 2 illustrates an example of a flowchart for installing a print control program in a mobile communication terminal.
Figure 3:
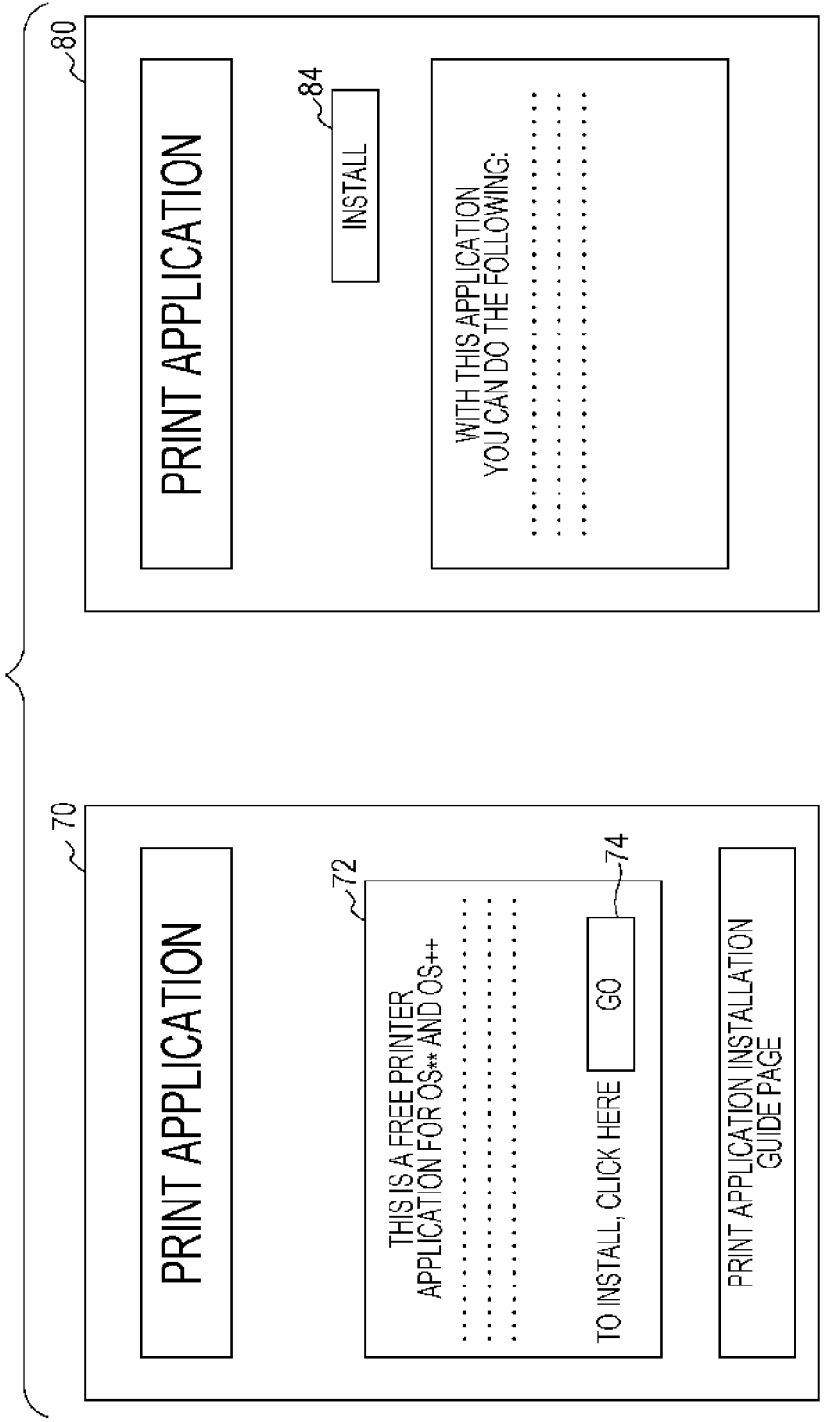
FIG. 3 represents examples of installation screens that may be displayed on the mobile communication terminal.

FIG. 2 illustrates an example of a flowchart for explaining the process of installing the print control program in the mobile communication terminal 20. FIG. 3 represents examples of the installation guide screen 70 and the installation execution screen 80.

The mobile communication terminal 20 first acquires, when installing the printer control program corresponding to the printer 40, the URL of the address information management server 50 from the printer 40 (step S100), and accesses the acquired URL (step S102).

The address information management server 50 detects the access by the mobile communication terminal 20 (step S150), and acquires the property information or properties of the mobile communication terminal 20 by analyzing the communication protocol (for example, HTTP) with the mobile communication terminal 20 (step S152).

Examples of the property information of the mobile communication terminal 20 acquired by the address information management server 50 upon analyzing the communication protocol include the OS information and language information of the mobile communication terminal 20.

Then the address information management server 50 generates the installation guide screen 70 on the basis of the property information of the mobile communication terminal 20 and the model information of the printer 40 acquired as above (step S154). In this sense, the installation guide screen 70 is customized for the mobile communication terminal 20. For example, the installation guide screen 70 generated for mobile communication terminals associated with a first OS may include links or URLs that are different from those included in the installation guide screen 70 generated for mobile communication terminals associated with a different OS.

The installation guide screen 70 includes guide text 72 for installing the print control program and a Go button 74 for instructing to start the installation of the print control program.

The guide text 72 is stated or presented in an appropriate language according to the language information that can be obtained from the property information of the mobile communication terminal 20. The Go button 74 is linked to the program management server 60 or, more specifically, to the network connection destination of the program management server 60 to be accessed for installing the print control program. The linkage with the network connection destination is determined according to the OS information of the mobile communication terminal 20. In this sense, the Go button 74 is configured for the mobile communication terminal 20 when generating the installation guide screen 70. When the Go button 74 is pressed or selected, a connection is realized with either of the program management server 1 (60A) and the program management server 2 (60B), depending on the OS information of the mobile communication terminal 20, and the request for the installation execution screen 80 of the print control program to the connected server.

Then the address information management server 50 transmits the data of the installation guide screen 70 to the mobile communication terminal 20 (step S156).

The mobile communication terminal 20 receives the data of the installation guide screen 70 (step S104) and activates a predetermined browser so as to read and display the installation guide screen 70 (step S106).

The mobile communication terminal 20 decides whether the Go button 74 has been pressed to instruct the installation (step S108). In the case where the Go button 74 has been pressed (Yes at step S108) the process advances to step S110. In the case where the Go button 74 has not been pressed (No at step S108), the process is finished without installing the print control program.

At the step S110, the mobile communication terminal 20 is connected to the program management server 1 (60A) or the program management server 2 (60B) whichever is linked with the Go button 74 configured, in one example by the address information management server. The mobile communication terminal 20 then transmits a request for the installation execution screen 80 of the printer control program to the program management server 60 to which mobile communication terminal 20 is connected.

The program management server 60 receives the request for the installation execution screen 80 (step S160) and generates the installation execution screen 80. The program management server 60 then transmits the data of the installation execution screen 80 to the mobile communication terminal 20 (step S162).

The mobile communication terminal 20 receives the data of the installation execution screen 80 (step S112), and activates a predetermined browser so as to read and display the installation execution screen 80 (step S114).

The installation execution screen 80 includes guide text of the print control program and an install button 84. Pressing or selecting the install button 84 starts the installation of the print control program.

Upon pressing the install button 84 the installation of the print control program is executed. In one example, download of the printer control program from the corresponding program management server 60 begins.

The mobile communication terminal 20 decides whether the install button 84 has been pressed (step S116). In the case where the install button 84 has been pressed (Yes at step S116) the process advances to step S118, and in the case where the install button 84 has not been pressed (No at step S116), the process is finished without installing the print control program.

At the step S118 when the install button 84 has been pressed or selected, the mobile communication terminal 20 transmits a request to download the printer control program from the corresponding program management server 60 (step S118).

The program management server 60 receives the download request from the mobile communication terminal 20 (step S164), and transmits the corresponding print control program to the mobile communication terminal 20 (step S166).

The mobile communication terminal 20 receives the print control program (step S120), and performs a predetermined installation process of the printer control program that has been received, so as to set the printer control program ready to be activated (step S122). At this point, the series of installation process is completed and the print control program is installed on the mobile communication terminal.

Through the foregoing process, the application software that controls the printing condition setting for the printer 40 by the mobile communication terminal 20 and the printing job performed by the printer 40 can be properly selected according to the OS and the language employed by the mobile communication terminal 20, and easily installed in the mobile communication terminal 20.

A method to add a function to the print control program will now be described. When the printer control program is installed in the mobile communication terminal 20, the initial form of a user interface screen is displayed on the touch panel as a second setting screen as shown in FIG. 5, upon activating the printer control program.

FIG. 5 thus illustrates examples of user interface screens according to the print control program.

The initial screen represents two launchers of different patterns. One pattern relates to functions that are already implemented. The other pattern relates to functions that have not been implemented.

A first launcher includes "photo", "document", "web", and "scan", indicating that these functions are already implemented and ready for use. These are basic functions of the printer 40, which are preinstalled in the print control program and ready for use. The expression "ready for use" in this embodiment means that the operational region accessible by the user (operation buttons) is visibly provided on the touch panel, and the function corresponding to the actual operation of the user is ready to be activated.

A second launcher includes "3D printing" and "colored picture printing", indicating that these functions are not implemented yet but can be added. These functions serve to increase the user-friendliness of the printer 40, by expanding the function thereof in addition to the basic functions such as photo printing. In this embodiment, the operational region (operation buttons) for downloading the program associated with the additional function and installing that function in the mobile communication terminal 20 is visibly provided at the position aligned with the operation buttons for the functions ready for use, apart from the basic functions. After the additional function is installed, the operational region for installing the additional function is substituted with the operational region of the same pattern as those of the basic functions. Alternatively, the operation buttons of the functions ready for use and the functions that can be added may be displayed in the same pattern, and the program associated with the functions that can be added may be installed when the operation button for the additional function is pressed.

Figure 4:
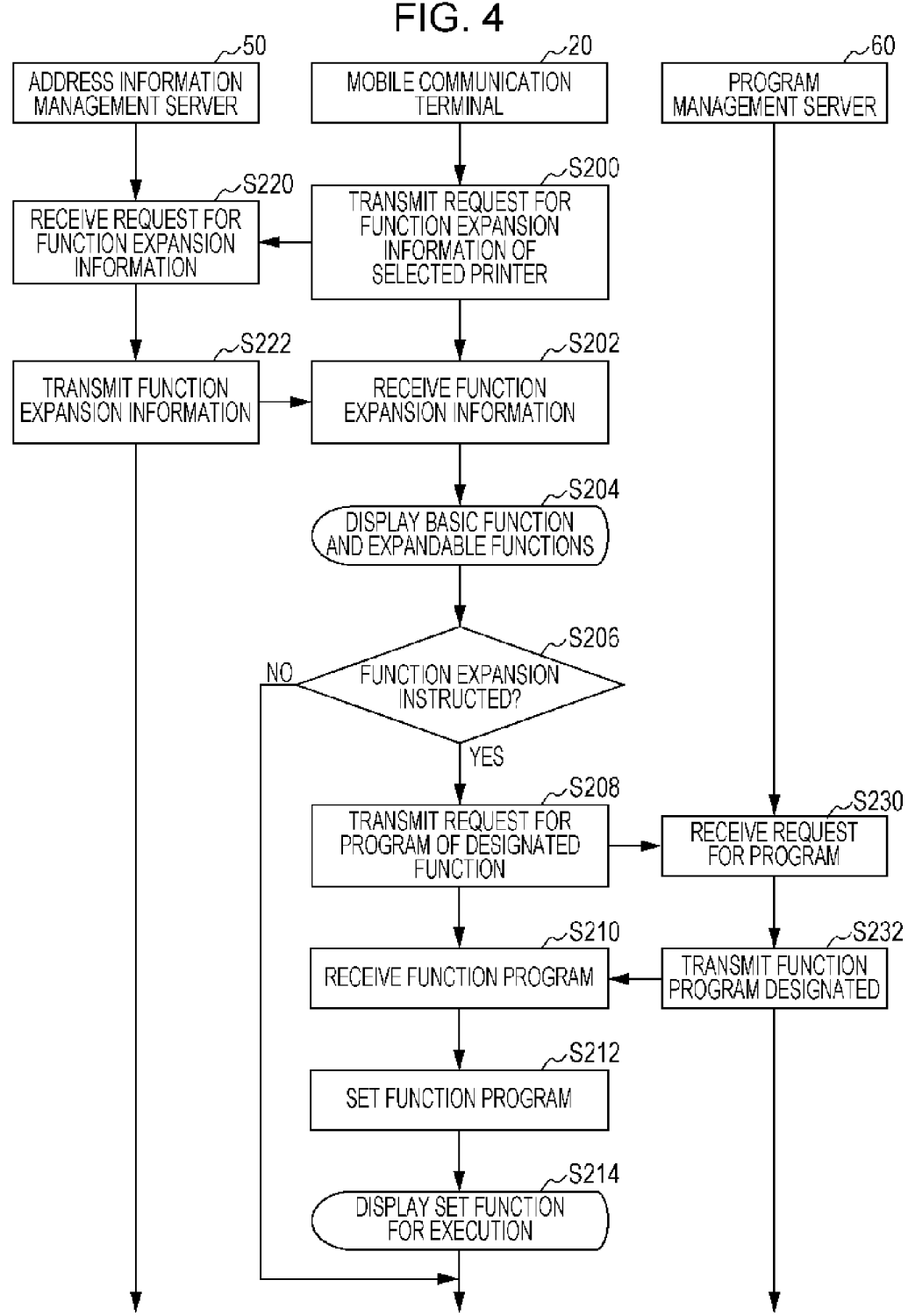
FIG. 4 illustrates an example of a flowchart for adding a function to a print control program.

A method to add a function will be described with reference to the flowchart shown in FIG. 4, in which the function of "3D printing" is taken up as example. FIG. 4 illustrates an example of a flowchart or method for adding a function to a print control apparatus.

First, when the printer 40 is designated on the mobile communication terminal 20 and the print control program is activated on the mobile communication terminal 20, the mobile communication terminal 20 transmits a request for the function expansion information indicating the functions that can be added in relation with the current functions of the printer 40 and for the access address, to the address information management server 50 (step S200).

The address information management server 50 receives the request for the function expansion information indicating the functions that can be added and for the access address (step S220), and extracts functions applicable to the printer 40, for example from the model information acquired from the printer 40 through the mobile communication terminal 20. Then the address information management server 50 generates the function expansion information indicating the functions that can be added, and transmits the generated function expansion information and the access address thereof to the mobile communication terminal 20 (step S222). The program installed in the mobile communication terminal 20 displays the second launcher corresponding to the function expansion information received, in which case the operational region for the installation may also be included in the display in the case where the additional function has not yet been installed.

The mobile communication terminal 20 can acquire the program associated with the additional function from the proper access address when the operation button is pressed, by storing the access address received from the address information management server 50 for acquiring the additional function in association with the operation button. The address information management server 50 may transmit a launcher image to the mobile communication terminal 20, as function expansion information. Here, the model information may be acquired from other than the printer 40. The model information may be contained in the print control program itself, or in another predetermined unit. The access address for acquiring the additional function may be contained in the print control program itself.

The mobile communication terminal 20 receives the function expansion information (step S202), and displays on the touch panel the basic functions ready for use under the print control program and the functions that can be added, as the initial screen shown in FIG. 5 (step S204).

In one example, the received function expansion information may be stored in the mobile communication terminal 20, and the initial screen may be displayed on the basis of the function expansion information stored when the initial screen is subsequently displayed.

The mobile communication terminal 20 decides whether an instruction to perform the function expansion has been received (step S206). In the case where the function expansion has been instructed (Yes at step S206) the process advances to step S208. On the contrary, in the case where the function expansion has not been instructed (No at step S206), the process is finished without adding a function to the print control program.

In one embodiment, the mobile communication terminal 20 decides that addition of the "3D printing" function has been instructed when the user presses the "install" button in the column of the "3D printing" in the initial screen shown in FIG. 5. In contrast, in the case where the user presses the "photo" button for example, the photo printing function preinstalled in the mobile communication terminal 20 is executed.

At the step S208, the mobile communication terminal 20 transmits a request for the program corresponding to the designated additional function, to the program management server 60 from which the print control program was downloaded. This request is transmitted to the access address acquired from the address information management server 50 or that was already stored on the mobile communication terminal 20.

The program management server 60 receives the request for the program (step S230), and transmits the function program for realizing the function requested by the mobile communication terminal 20 (step S232) to the mobile communication terminal 20.

Upon receipt of the function program (step S210), the mobile communication terminal 20 sets the received function program ready for use (step S212). For example, the received function program is installed.

Then the mobile communication terminal 20 displays the added function as a function that is ready for use (step S214).

Through the foregoing process, the function program for the "3D printing" is enabled to be executed under the print control program, and the function of "3D printing" is displayed as a function that is ready for use, as the screen showing the added function shown in FIG. 5.

Embodiments described herein provide the following advantageous effects.

The address information management server 50 generates the appropriate installation guide screen 70 according to the model of the printer 40 and the OS of the mobile communication terminal 20, and causes the mobile communication terminal 20 to display the generated installation guide screen 70. Such an arrangement allows the user to easily install the appropriate print control program that corresponds to the printer 40 and the mobile communication terminal 20, in the mobile communication terminal 20.

In general, the program management server 60 may be managed by a carrier of the mobile communication terminal 20. Likewise, a control program for a device other than the mobile communication terminal 20 is generally provided by the manufacturer of the device. In the case where the manufacturer of that device is to store the control program in the program management server 60 of a plurality of carriers, the carrier of the mobile communication terminal 20 is unable to know the storage locations of other carriers. As a result, it is difficult to acquire the control program from the program management server 60. With the configuration according to the foregoing embodiments, information only available to the manufacturer holding the control program can be acquired through the address information management server 50 provided by the relevant manufacturer. In this sense, the manufacture is able to direct a mobile communication terminal to an appropriate access address for a control program.

Although embodiments have been described with reference to the accompanying drawings, it is to be understood that embodiments of the invention are not limited to the foregoing embodiments but may be modified in various manners within the scope of the invention. Some examples of such modifications will be described hereunder.

The foregoing embodiment exemplifies a system in which the printer 40 stores the access address of the address information management server 50, and the mobile communication terminal 20 acquires the access address for the print control program in the program management server 60 through the address information management server 50. Alternatively, the printer 40 may be configured to store the access address, and the mobile communication terminal 20 may acquire the access address from the printer 40 to thereby directly access the access address without the intermediation of the address information management server 50.

In one embodiment, the printer 40 stores the access address of the address information management server 50, the mobile communication terminal 20 is connected to the address information management server 50 according to the access address acquired from the printer 40, and the property information of the mobile communication terminal 20 is utilized to identify the program management server 60 corresponding to the OS.

Alternatively, the printer 40 may be configured to identify the program management server 60 as follows. The printer 40 may be configured to store the access address of the program management server 60 corresponding to the mobile communication terminal 20 in a storage unit and to receive the property information of the mobile communication terminal 20 from the mobile communication terminal 20 through the input unit 22. The control unit may convert the access address of the program management server 60 corresponding to the OS of the mobile communication terminal 20 according to the property information into a readable image such as a QR Code®, and display the image on the display unit of the printer 40. The mobile communication terminal 20 may read and decode the QR Code® to thereby acquire the access address. The mobile communication terminal then accesses the program management server 60 corresponding to the OS employed by the mobile communication terminal 20. For transmission and reception of other kinds of information, the arrangement according to the embodiment or the variation may be adopted, unless contradiction is incurred.

Although the information exclusive to a specific model of the printer 40 may be displayed in the form of a QR Code® in at least one embodiment, error information or status information of the printer 40 may also be displayed in the form of the QR Code®. Such information may be read by the input unit 22 of the mobile communication terminal 20 and transmitted to the address information management server 50.

The address information management server 50 may generate an HTML file presenting a proper method to avoid the error or a predetermined message to the user according to the information received, and transmit the HTML file or other data to the mobile communication terminal 20 to be displayed thereon. Such an arrangement allows the user to obtain the method to avoid the error or the status information of the printer 40, from the mobile communication terminal 20.

Although the program management server 60 is provided according to the OS employed by the mobile communication terminal 20 in the embodiment, the program management server may be provided according to the carrier of the mobile communication terminal. In other words, the information used in determining which access address to provide to a mobile communication terminal can be based on various properties, including by way of example only, OS of the mobile communication terminal, carrier of the mobile communication terminal, or the like or combination thereof.

Although the mobile communication terminal 20 is configured to acquire the print control program from the program management server 60, the mobile communication terminal 20 may acquire an electronic manual or the like corresponding to the model of the printer 40, instead of or in addition to the print control program.

The access address for acquiring the print control program and the access address for acquiring a function that can be added to the print control program may both stored in the same address information management server 50. However these access addresses may be stored in different address information management servers, so as to separately manage the access addresses.

Although the device is exemplified by the printer 40 in some embodiments, the device may be an information processing apparatus such as a projector or a scanner that is connectable to the network 35 and controlled by a device driver set up as a program, and an electronic apparatus other than the information processing apparatus, such as a refrigerator or a microwave oven. In such a case, a control program (first control unit) that controls execution of a predetermined function given to the device, i.e., the information processing apparatus or electronic apparatus, is employed in place of the print control program, as the program to be installed in the mobile communication terminal 20 and executed. In the embodiment, the "3D printing" and "colored picture printing" are taken up for the description of the function expansion information indicating the functions that can be added to the basic functions of the printer, for instance the printing function, in relation to the functions (specifications) given to the printer.

Alternatively, a predetermined program (second control unit collectively representing the function expansion information and the predetermined program) including firmware of the device such as the information processing apparatus or electronic apparatus may be adopted, without limitation to the function expansion information indicating the functions that can be added.

Further, the control program for the device is not limited to the print control program sequentially executed by a CPU. For example, a group of data for instructing a function to be executed from a server connectable to the network 35 to control the device or a cloud server may be adopted.

Embodiments of the invention may enable a mobile communication terminal (or other device) to download or have access to a control program such that the functionality of a device to be controlled can be implemented from the mobile communication device. Some of the examples disclosed herein enable a printer to be controlled or enable the functionality of a printer (e.g., the device to be controlled) to be implemented from a mobile communication terminal. The device to be controlled is not limited to printers, scanners, or such devices, but includes any other device that can receive and execute commands that originate at a remote device. Consequently, embodiments of the invention enable control programs to be downloaded and implemented for such devices on at least mobile communication terminals.

The foregoing process may be executed by a single apparatus or a combination of a plurality of apparatuses. Further, the term "install" employed in the embodiment refers not only to installation of the program, but also to setting up the control unit that controls the device in the mobile communication terminal 20 for execution.

The configurations and combinations thereof according to the foregoing embodiments and variations are merely exemplary, and those configurations may be added, excluded, substituted, or otherwise modified, within the scope of the invention. Further, the invention is not limited to the embodiment, but limited solely by the appended claims.

What is claimed is:

1. A system for acquiring a program, that can be installed in a mobile communication terminal from a first server in which the program is stored, the program including a first control unit and a second control unit which expands a function of the first control unit configured to control a device upon being installed in the mobile communication terminal, the system comprising:
    a second server that identifies an access address of the first control unit in the first server according to property information of the mobile communication terminal, and that identifies the second control unit corresponding to the device according to a device information of the device,
    wherein the second server transmits the access address of the first control unit and information of the second control unit to the mobile communication terminal, the second server thereafter causes the mobile communication terminal to install the first control unit corresponding to the mobile communication terminal, the second server causes the mobile communication terminal to install the second control unit corresponding to the device connected with the mobile communication terminal.

2. The system according to claim 1,
wherein the second server
generates a first setting screen to be displayed on the mobile communication terminal and configured to allow the mobile communication terminal to be connected to the access address identified according to the property information, and
transmits the first setting screen to the mobile communication terminal.

3. The system according to claim 2,
wherein the second server
identifies, according to the device information, an additional function that can be added to the program installed in the mobile communication terminal, and
transmits information of the additional function, to the mobile communication terminal.

4. The system according to claim 3,
wherein the second server transmits the access address for acquiring the additional function, to the mobile communication terminal.

5. The system according to claim 3,
wherein the program is configured to display a first launcher for causing the mobile communication terminal to execute basic functions installed therein and a second launcher for installing the additional function that has not yet been installed in the mobile communication terminal, the first launcher and the second launcher being different in display pattern, and the second launcher displayed on the mobile communication terminal is associated with the additional function identified by the second server.

6. A method for installing a control program on a first device that can control functionality of a second device, the method comprising:
    acquiring an address of an information address information management server at the first device from the second device, the address being transmitted to the first device as a decodable signal, the decodable signal containing the address of the information address information management server being associated with a sound transmitted by the second device;
    accessing the address;
    receiving an installation guide screen from the information address information management server, wherein the installation guide screen is configured with a link to a program management server that is based at least on properties of the first device;
    accessing the program management server using the link;
    downloading the control program from the program management server; and
    installing the control program on the first device, wherein the control program enables the first device to control the functionality of the second device.

* * * * *